US011147070B2

(12) United States Patent
Li et al.

(10) Patent No.: US 11,147,070 B2
(45) Date of Patent: Oct. 12, 2021

(54) TECHNIQUES FOR USE IN ITERATIVELY PROCESSING MESSAGES

(71) Applicant: QUALCOMM Incorporated, San Diego, CA (US)

(72) Inventors: Junyi Li, Chester, NJ (US); Alexander Leonidov, Somerset, NJ (US); Thomas Joseph Richardson, South Orange, NJ (US)

(73) Assignee: QUALCOMM Incorporated, San Diego, CA (US)

(*) Notice: Subject to any disclaimer, the term of this patent is extended or adjusted under 35 U.S.C. 154(b) by 113 days.

(21) Appl. No.: 16/551,299

(22) Filed: Aug. 26, 2019

(65) Prior Publication Data
US 2020/0077403 A1 Mar. 5, 2020

Related U.S. Application Data

(60) Provisional application No. 62/723,769, filed on Aug. 28, 2018.

(51) Int. Cl.
H04W 72/04 (2009.01)
H04B 17/336 (2015.01)
H04W 4/46 (2018.01)
H04B 7/01 (2006.01)
H04B 7/06 (2006.01)
H04W 88/02 (2009.01)

(52) U.S. Cl.
CPC .......... H04W 72/0466 (2013.01); H04B 7/01 (2013.01); H04B 7/0665 (2013.01); H04B 17/336 (2015.01); H04W 4/46 (2018.02); H04W 88/023 (2013.01)

(58) Field of Classification Search
CPC .. H04W 72/0466; H04W 4/46; H04B 17/336; H04B 7/01; H04B 7/0665; H04L 1/0051
See application file for complete search history.

(56) References Cited

U.S. PATENT DOCUMENTS

| | | | |
|---|---|---|---|
| 8,738,860 B1 * | 5/2014 | Griffin | G06F 13/4022 711/122 |
| 10,020,825 B1 | 7/2018 | Patel | |
| 2006/0059411 A1 * | 3/2006 | Dacosta | H04L 1/0051 714/794 |
| 2008/0148133 A1 | 6/2008 | Duggan | |
| 2011/0206147 A1 * | 8/2011 | Hariharan | H04L 1/08 375/260 |
| 2013/0107791 A1 * | 5/2013 | Oh | H04W 4/08 370/312 |
| 2014/0269627 A1 | 9/2014 | Gorokhov et al. | |
| 2015/0296384 A1 * | 10/2015 | Sadek | H04W 16/14 455/452.1 |
| 2017/0099624 A1 * | 4/2017 | Baghel | H04W 36/0072 |

OTHER PUBLICATIONS

International Search Report and Written Opinion—PCT/US2019/048348—ISA/EPO—dated Oct. 30, 2019.

* cited by examiner

Primary Examiner — Mohammad S Anwar
(74) Attorney, Agent, or Firm — Qualcomm Incorporated

(57) ABSTRACT

Aspects of the present disclosure relate to wireless communications, and more particularly, to techniques for use in receiving devices employing at least one iterative process for decoding messages. In certain example aspects, a receiving device may comprise a user equipment (UE) or other like device that may be configured to support device-to-device (D2D) communications, such as vehicle-to-vehicle (V2V) communications, or the like.

41 Claims, 9 Drawing Sheets

TECHNIQUES FOR USE IN ITERATIVELY PROCESSING MESSAGES

PRIORITY CLAIM

This application claims priority to and the benefit of Provisional Patent Application No. 62/723,769 filed in the U.S. Patent and Trademark Office on Aug. 28, 2018, the entire content of which is incorporated herein by reference as if fully set forth below in its entirety and for all applicable purposes.

INTRODUCTION

Aspects of the present disclosure relate to wireless communications, and more particularly, to techniques for use in receiving devices employing at least one iterative process for decoding messages. In certain example aspects, a receiving device may comprise a user equipment (UE) or other like device that may be configured to support device-to-device (D2D) communications, such as vehicle-to-vehicle (V2V) communications, or the like.

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power). Examples of such multiple-access technologies include Long Term Evolution (LTE) systems, code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

In some examples, a wireless multiple-access communication system may include a number of base stations, each simultaneously supporting communication for multiple communication devices, otherwise known as user equipment (UEs). In LTE or LTE-A network, a set of one or more base stations may define an eNodeB (eNB). In other examples (e.g., in a next generation or 5G network), a wireless multiple access communication system may include a number of distributed units (DUs) (e.g., edge units (EUs), edge nodes (ENs), radio heads (RHs), smart radio heads (SRHs), transmission reception points (TRPs), etc.) in communication with a number of central units (CUs) (e.g., central nodes (CNs), access node controllers (ANCs), etc.), where a set of one or more distributed units, in communication with a central unit, may define an access node (e.g., a new radio base station (NR BS), a new radio node-B (NR NB), a network node, 5G NB, gNB, etc.). A base station or DU may communicate with a set of UEs on downlink channels (e.g., for transmissions from a base station or to a UE) and uplink channels (e.g., for transmissions from a UE to a base station or distributed unit).

These multiple access technologies have been adopted in various telecommunication standards to provide a common protocol that enables different wireless devices to communicate on a municipal, national, regional, and even global level. An example of an emerging telecommunication standard is new radio (NR), for example, 5G radio access. NR is a set of enhancements to the LTE mobile standard promulgated by Third Generation Partnership Project (3GPP). It is designed to better support mobile broadband Internet access by improving spectral efficiency, lowering costs, improving services, making use of new spectrum, and better integrating with other open standards using OFDMA with a cyclic prefix (CP) on the downlink (DL) and on the uplink (UL) as well as support beamforming, multiple-input multiple-output (MIMO) antenna technology, and carrier aggregation.

However, as the demand for mobile broadband access continues to increase, there exists a need for further improvements in NR technology. In a particular example, there may be a need to process multiple received messages during a short period of time, e.g., to reduce delayed communications. Hence, techniques for processing messages in an efficient and timely manner may be beneficial, particularly with regard to certain time-critical communications such as in D2D, V2V and other like implementations.

BRIEF SUMMARY

The systems, methods, and devices of the disclosure each have several aspects, no single one of which is solely responsible for its desirable attributes. Without limiting the scope of this disclosure as expressed by the claims which follow, some features will now be discussed briefly. After considering this discussion, and particularly after reading the section entitled "Detailed Description" one will understand how the features of this disclosure provide advantages that include improved communications between access points and stations in a wireless network.

In accordance with certain aspects, a method may be provided for use at a receiving device in processing a set of messages. The method may comprise identifying a next message as arranged in an order in the set of messages, determining an iterative threshold value for the next message based, at least in part, on a remaining portion of a processing time budget associated with the set of messages, and a relative position of the next message within the order, and attempting to decode the next message using an iterative process limited by the iterative threshold value.

In some implementations, the method may also comprise determining the iterative threshold value for the next message based further on at least one characteristic of a communication channel over which the next message was received by the receiving device. Here, for example, a characteristic of a communication channel may comprise or otherwise correspond to a Doppler characteristic, a delay spread characteristic, a signal to interference ratio characteristic, a signal to noise ratio characteristic, and/or the like or some combination thereof. In certain instances, a characteristic of the communication channel may be based, at least in part, on a reference signal portion (e.g., DMRS, etc.) of data received via the communication channel conveying the next message. In certain implementations, at least one of messages may comprise a V2V safety message or the like. In certain implementations, a receiving device may comprise a UE. In certain implementations, an iterative threshold value may be applied as a weighting factor in determining the iterative threshold value.

In accordance with an example implementation, an iterative threshold value for the next message may be equal to $a*T/(N-k+1)/z$, wherein the sequential order is represented as messages numbered 1 through N with N being an integer greater than 1, k represents the next message as numbered by the sequential order with k being an integer, T represents the processing time budget, z represents a processing time per iteration of the iterative process, and a represents the weighting factor with a being a real number. In certain examples, a weighting factor, a, may be based, at least in part, on at least one characteristic of a communication channel over which the message k was received by the receiving device, or a sequence number corresponding to the next message within the sequential order, or a both. In certain instances, a weighting factor, a, for a message number 1 may be greater than the weighting factor, a, for a message number N. In certain other instances, a weighting factor, a, for a message number N may be greater than the weighting factor, a, for a message number 1.

In accordance with still other aspects, a receiving device may be provided which comprises a receiver, a memory and at least one processing unit. The processing unit may be coupled to the receiver and the memory and configured to identify a next message as arranged in an order in a set of messages received via the receiver and stored in the memory, determine an iterative threshold value for the next message based, at least in part, on a remaining portion of a processing time budget associated with the set of messages, and a relative position of the next message within the order, and attempt to decode the next message using an iterative process limited by the iterative threshold value.

In accordance with yet other aspects, an apparatus for use by a receiving device in processing a set of messages may be provided. For example, such an apparatus may comprises a means for identifying a next message as arranged in an order in the set of messages, a means determining an iterative threshold value for the next message based, at least in part, on a remaining portion of a processing time budget associated with the set of messages, and a relative position of the next message within the order, and a means for attempting to decode the next message using an iterative process limited by the iterative threshold value.

In accordance with another aspect, an article of manufacture may be provided which comprises a non-transitory computer readable medium having stored therein computer implementable instructions executable by a processing unit of a receiving device to identify a next message as arranged in an order in a set of messages received by the receiving device, determine an iterative threshold value for the next message based, at least in part, on a remaining portion of a processing time budget associated with the set of messages, and a relative position of the next message within the order, and attempt to decode the next message using an iterative process limited by the iterative threshold value.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Figure 1:
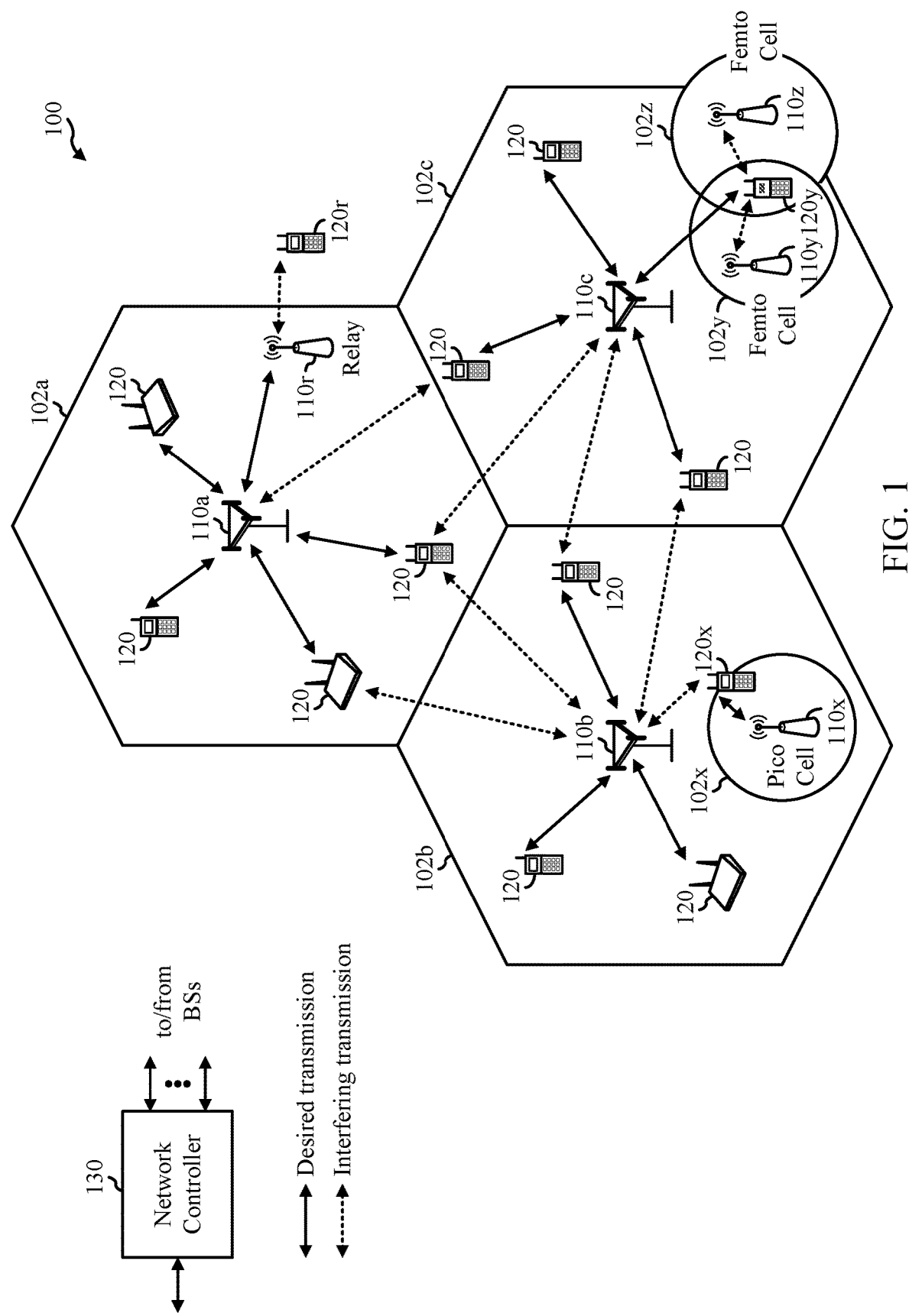
FIG. 1 is a block diagram conceptually illustrating an example telecommunications system, in accordance with certain aspects of the present disclosure.

Techniques are presented herein, which may be implemented in various receiving devices to process multiple received messages during a set period of time. The example techniques may improve efficiency in certain instances, for example, by controlling one or more iterative processes that may be employed in decoding or other like processing of received messages. Such techniques may be of particular usefulness in multi-user broadcast scenarios or the like, wherein important, possibly, time-critical communications are exchanged. By way of an example, receiving devices engaged in D2D, V2V, peer to peer, and/or other like forms of communication may benefit from techniques as presented herein.

As disclosed in greater detail herein, techniques are provided for use in a receiving device that is configured to process messages in a manner that employs an iterative process, at least in part. For example, in certain implementations, a receiving device may comprise one or more processing units (e.g., as part of a wireless modem, a computing resource, a receiver processor, a system on a chip, a circuit, etc.) that is configured to decode or other process received message related data/signals by way of at least one iterative process.

To process a received message, a receiving device (e.g., a UE, etc.) may perform decoding or other like processing that comprises an iterative process that may act to enhance performance via multiple iterations. By way of a non-limiting example, in certain implementations a receiving device may comprise a modem or other like processing unit implementing an iterative process supporting a turbo equalizer or the like, wherein channel estimation and decoding may be performed iteratively to enhance performance. Such an example implementation may be particularly beneficial in certain (high) Doppler fading environments, etc. In general, performance may improve as the number of iterations increases. However, such performance gains may diminish after some point. Furthermore, a message processing time will increase with additional iterations.

One example of a receiving device that may benefit from techniques presented herein is a UE configured to support V2V communications. Such a receiving device may comprise a C-V2X modem or other like processing unit that may be configured to decode safety messages broadcast by other nearby vehicles. When there are many vehicles and/or messages received therefrom, an overall message processing time may increase (e.g., linearly) with the number of messages to be decoded or otherwise processed, and particularly when such comprises an iterative process. There may be a tradeoff, as the number of iterations increases, a probability to decode a message may also increase, however, the remaining processing time budget for decoding other messages may decrease such that a probability of being able to decode the other messages may be reduced. Accordingly, it may be useful for such a receiving device to be configured to determine how many iterations to invest in attempting to process a particular received message.

With this in mind, certain aspects of the present disclosure provide apparatus, methods, processing systems, and computer readable mediums for NR (new radio access technology or 5G technologies).

NR may support various wireless communication services, such as Enhanced mobile broadband (eMBB) targeting wide bandwidth (e.g. 80 MHz beyond), millimeter wave (mmW) targeting high carrier frequency (e.g. 27 GHz or beyond), massive MTC (mMTC) targeting non-backward compatible MTC techniques, and/or mission critical targeting ultra-reliable low latency communications (URLLC). These services may include latency and reliability requirements. These services may also have different transmission time intervals (TTI) to meet respective quality of service (QoS) requirements. In addition, these services may co-exist in the same subframe. In LTE, the basic transmission time interval (TTI) or packet duration is 1 subframe. In NR, a subframe may still be 1 ms, but the basic TTI may be referred to as a slot. A subframe may contain a variable number of slots (e.g., 1, 2, 4, 8, 16, . . . slots) depending on the tone-spacing (e.g., 15, 30, 60, 120, 240 . . . kHz).

Some aspects of the present disclosure relate to device-to-device communications. As further described herein, sidelink communication may refer to direct communications between UEs that may or may not be supported by other network resources. For example, certain aspects herein may be described with respect to V2V communications, which is a real-world application of sidelink communications. It should be noted, however, that though certain aspects are described with respect to V2V communications for ease of explanation and reference to a specific useful implementation, such aspects should not be limited to V2V communications and may be used for other types of communication.

A modern automobile is a powerful and complex electromechanical system that includes a large number of processors, sensors, and systems-on-chips (SoCs) that control many of the vehicle's functions, features, and operations. More recently, manufacturers have begun equipping automobiles with Advanced Driver Assistance Systems (ADASs) that automate, adapt, or enhance the vehicle's operations. For example, an ADAS may be configured to use information collected from the automobile's sensors (e.g., accelerometer, radar, lidar, geospatial positioning, camera, etc.) to automatically detect a potential road hazard, and assume control over all or a portion of the vehicle's operations (e.g., braking, steering, etc.) to avoid detected hazards. Features and functions commonly associated with an ADAS include adaptive cruise control, automated lane detection, lane departure warning, automated steering, automated braking, and automated accident avoidance.

Further, vehicles, as an example of UEs, may communicate data directly between each other (e.g., using sidelink communications). Based on such V2V communications, one vehicle may utilize data received from another vehicle to control its functions, features, and operations, such as ADAS operations. For example, the vehicle may use the data from another vehicle to enhance "visibility" or detection of neighboring vehicles, of objects detectable by the neighboring vehicles not detectable by the vehicle itself, etc. In another example, vehicle(s) may transmit and receive safety messages or the like, which may be time-critical, as may be expected.

In certain aspects, the amount (e.g., size) of data that can be communicated using V2V communications (referred to as V2V data) may be large. For example, a UE (e.g., a vehicle), utilizing the sensors of the UE (e.g., accelerometer, radar, lidar, geospatial positioning, camera, etc.) may determine certain parameters (e.g., position, speed, direction of movement, etc.) about the UE itself (referred to as UE parameters). The UE, utilizing the sensors of the UE may further determine certain parameters (e.g., position, speed, direction of movement, size, etc.) about other objects (e.g., vehicles, pedestrians, roadside objects, buildings, etc.) (referred to as object parameters). The UE, therefore, can communicate one or more UE parameters and/or one or more object parameters to other UEs nearby using V2V communications. Further, the UE may communicate data (e.g., raw data) from the sensors of the UE (e.g., referred to as sensor data), or other appropriate data. Therefore, V2V data may include one or more of one or more UE parameters, one or more object parameters, sensor data from one or more sensors, etc. Accordingly, certain aspects herein relate to more efficient techniques for communicating data (e.g., V2V data) using sidelink communications (e.g., V2V communications).

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim. The word "exemplary" is used herein to mean "serving as an example, instance, or illustration." Any aspect described herein as "exemplary" is not necessarily to be construed as preferred or advantageous over other aspects.

The techniques described herein may be used for various wireless communication networks such as LTE, CDMA, TDMA, FDMA, OFDMA, SC-FDMA and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS). NR is an emerging wireless communications technology under development in conjunction with the 5G Technology Forum (5GTF). 3GPP Long Term Evolution (LTE) and LTE-Advanced (LTE-A) are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). The techniques described herein may be used for the wireless networks and radio technologies mentioned above as well as other wireless networks and radio technologies. For clarity, while aspects may be described herein using terminology commonly associated with 3G and/or 4G wireless technologies, aspects of the present disclosure can be applied in other generation-based communication systems, such as 5G and later, including NR technologies.

Example Wireless Communications System

FIG. 1 illustrates an example wireless communication network 100 in which aspects of the present disclosure may be performed. For example, the wireless network may be a new radio (NR) or 5G network. UEs 120 may be configured to perform operations and methods described herein.

As illustrated in FIG. 1, the wireless network 100 may include a number of BSs 110 and other network entities. A BS may be a station that communicates with UEs. Each BS 110 may provide communication coverage for a particular geographic area. In 3GPP, the term "cell" can refer to a coverage area of a Node B and/or a Node B subsystem serving this coverage area, depending on the context in which the term is used. In NR systems, the term "cell" and gNB, Node B, 5G NB, AP, NR BS, NR BS, or TRP may be interchangeable. In some examples, a cell may not necessarily be stationary, and the geographic area of the cell may move according to the location of a mobile BS. In some examples, the base stations may be interconnected to one another and/or to one or more other BSs or network nodes (not shown) in the wireless communication network 100 through various types of backhaul interfaces such as a direct physical connection, a virtual network, or the like using any suitable transport network.

In general, any number of wireless networks may be deployed in a given geographic area. Each wireless network may support a particular radio access technology (RAT) and may operate on one or more frequencies. A RAT may also be referred to as a radio technology, an air interface, etc. A frequency may also be referred to as a carrier, a frequency channel, etc. Each frequency may support a single RAT in a given geographic area in order to avoid interference between wireless networks of different RATs. In some cases, NR or 5G RAT networks may be deployed.

A BS may provide communication coverage for a macro cell, a pico cell, a femto cell, and/or other types of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a Closed Subscriber Group (CSG), UEs for users in the home, etc.). A BS for a macro cell may be referred to as a macro BS. A BS for a pico cell may be referred to as a pico BS. A BS for a femto cell may be referred to as a femto BS or a home BS. In the example shown in FIG. 1, the BSs 110a, 110b and 110c may be macro BSs for the macro cells 102a, 102b and 102c, respectively. The BS 110x may be a pico BS for a pico cell 102x. The BSs 110y and 110z may be femto BS for the femto cells 102y and 102z, respectively. A BS may support one or multiple (e.g., three) cells.

The wireless communication network 100 may also include relay stations. A relay station is a station that receives a transmission of data and/or other information from an upstream station (e.g., a BS or a UE) and sends a transmission of the data and/or other information to a downstream station (e.g., a UE or a BS). A relay station may also be a UE that relays transmissions for other UEs. In the example shown in FIG. 1, a relay station 110r may communicate with the BS 110a and a UE 120r in order to facilitate communication between the BS 110a and the UE 120r. A relay station may also be referred to as a relay BS, a relay, etc.

The wireless network 100 may be a heterogeneous network that includes BSs of different types, e.g., macro BS, pico BS, femto BS, relays, etc. These different types of BSs may have different transmit power levels, different coverage areas, and different impact on interference in the wireless network 100. For example, macro BS may have a high transmit power level (e.g., 20 Watts) whereas pico BS, femto BS, and relays may have a lower transmit power level (e.g., 1 Watt).

The wireless communication network 100 may support synchronous or asynchronous operation. For synchronous operation, the BSs may have similar frame timing, and transmissions from different BSs may be approximately aligned in time. For asynchronous operation, the BSs may have different frame timing, and transmissions from different BSs may not be aligned in time. The techniques described herein may be used for both synchronous and asynchronous operation.

A network controller 130 may couple to a set of BSs and provide coordination and control for these BSs. The network controller 130 may communicate with the BSs 110 via a backhaul. The BSs 110 may also communicate with one another, e.g., directly or indirectly via wireless or wireline backhaul.

The UEs 120 (e.g., 120x, 120y, etc.) may be dispersed throughout the wireless network 100, and each UE may be stationary or mobile. A UE may also be referred to as a mobile station, a terminal, an access terminal, a subscriber unit, a station, a Customer Premises Equipment (CPE), a cellular phone, a smart phone, a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or medical equipment, a biometric sensor/device, a wearable device such as a smart watch, smart clothing, smart glasses, a smart wrist band, smart jewelry (e.g., a smart ring, a smart bracelet, etc.), an entertainment device (e.g., a music device, a video device, a satellite radio, etc.), a vehicular component or sensor, a smart meter/sensor, industrial manufacturing equipment, a global positioning system device, or any other suitable device that is configured to communicate via a wireless or wired medium. Some UEs may be considered evolved or machine-type communication (MTC) devices or evolved MTC (eMTC) devices. MTC and eMTC UEs include, for example, robots, drones, remote devices, sensors, meters, monitors, location tags, etc., that may communicate with a BS, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices.

In FIG. 1, a solid line with double arrows indicates desired transmissions between a UE and a serving BS, which is a BS designated to serve the UE on the downlink and/or uplink. A dashed line with double arrows indicates interfering transmissions between a UE and a BS.

Certain wireless networks (e.g., LTE) utilize orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kHz and the minimum resource allocation (called a "resource block" (RB)) may be 12 subcarriers (or 180 kHz). Consequently, the nominal FFT size may be equal to 128, 256, 512, 1024 or 2048 for system bandwidth of 1.25, 2.5, 5, 10 or 20 megahertz (MHz), respectively. The system bandwidth may also be partitioned into subbands. For example, a subband may cover 1.08 MHz (i.e., 6 resource blocks), and there may be 1, 2, 4, 8 or 16 subbands for system bandwidth of 1.25, 2.5, 5, 10 or 20 MHz, respectively.

While aspects of the examples described herein may be associated with LTE technologies, aspects of the present disclosure may be applicable with other wireless communications systems, such as NR.

NR may utilize OFDM with a cyclic prefix (CP) on the uplink and downlink and include support for half-duplex operation using time division duplexing (TDD). A single component carrier (CC) bandwidth of 100 MHz may be supported. NR resource blocks may span 12 subcarriers with a subcarrier bandwidth of 75 kHz over a 0.1 ms duration. Each radio frame may consist of 2 half frames, each half frame consisting of 5 subframes, with a length of 10 ms. Consequently, each subframe may have a length of 1 ms. Each subframe may indicate a link direction (i.e., DL or UL) for data transmission and the link direction for each subframe may be dynamically switched. Each subframe may include DL/UL data as well as DL/UL control data. UL and DL subframes for NR may be as described in more detail below with respect to FIGS. 6 and 7. Beamforming may be supported and beam direction may be dynamically configured. MIMO transmissions with precoding may also be supported. MIMO configurations in the DL may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells. Alternatively, NR may support a different air interface, other than an OFDM-based. NR networks may include entities such central units (CUs) and/or distributed units (DUs).

In some examples, access to the air interface may be scheduled, wherein a scheduling entity (e.g., a base station) allocates resources for communication among some or all devices and equipment within its service area or cell. Within the present disclosure, as discussed further below, the scheduling entity may be responsible for scheduling, assigning, reconfiguring, and releasing resources for one or more subordinate entities. That is, for scheduled communication, subordinate entities utilize resources allocated by the scheduling entity. Base stations are not the only entities that may function as a scheduling entity. That is, in some examples, a UE may function as a scheduling entity, scheduling resources for one or more subordinate entities (e.g., one or more other UEs). In this example, the UE is functioning as a scheduling entity, and other UEs utilize resources scheduled by the UE for wireless communication. A UE may function as a scheduling entity in a peer-to-peer (P2P) network, and/or in a mesh network. In a mesh network example, UEs may optionally communicate directly with one another in addition to communicating with the scheduling entity.

Thus, in a wireless communication network with a scheduled access to time-frequency resources and having a cellular configuration, a P2P configuration, and a mesh configuration, a scheduling entity and one or more subordinate entities may communicate utilizing the scheduled resources.

Figure 2:
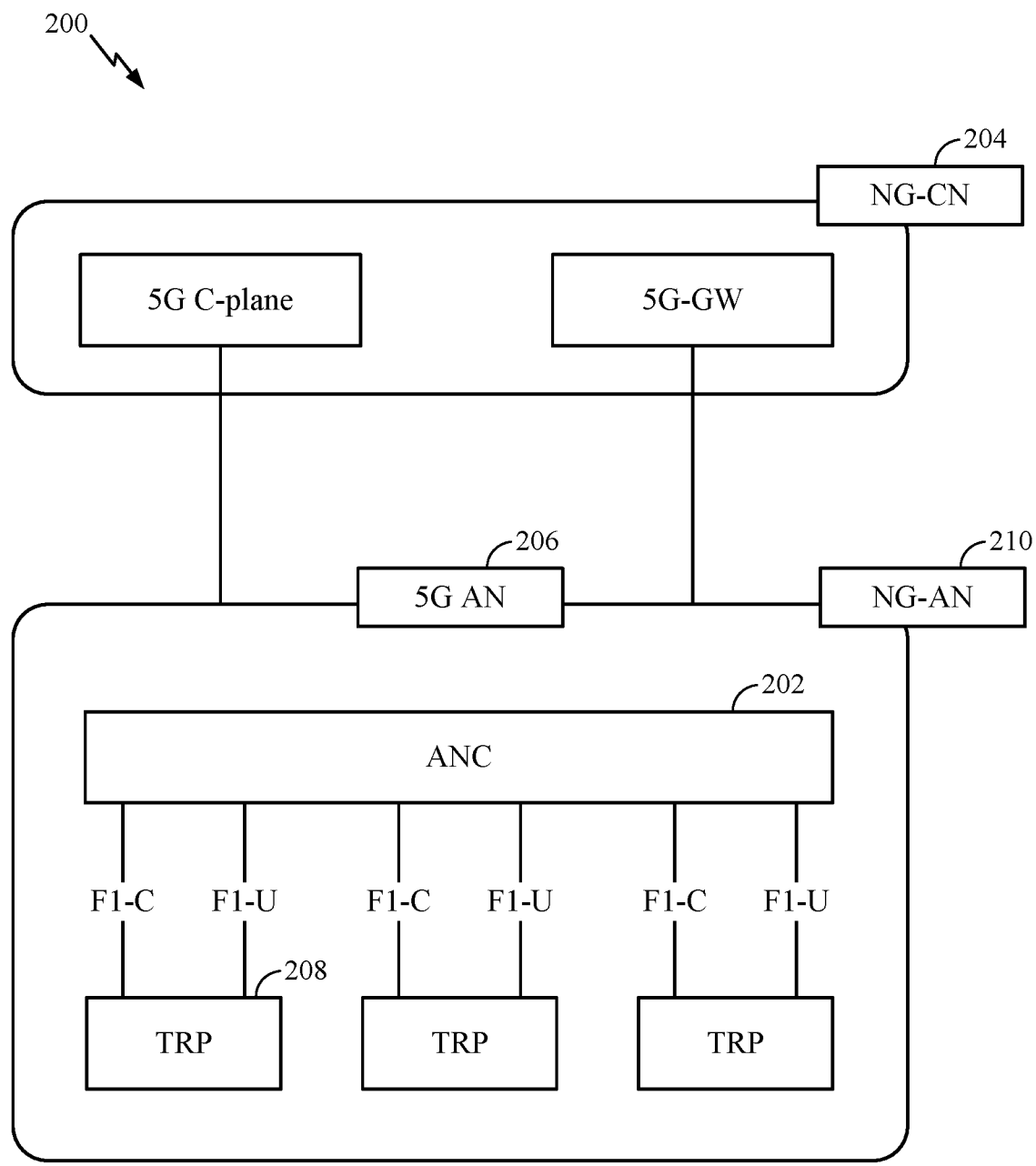
FIG. 2 is a block diagram illustrating an example logical architecture of a distributed RAN, in accordance with certain aspects of the present disclosure.

FIG. 2 illustrates an example logical architecture of a distributed radio access network (RAN) 200, which may be implemented in the wireless communication system illustrated in FIG. 1. A 5G access node 206 may include an access node controller (ANC) 202. The ANC may be a central unit (CU) of the distributed RAN 200. The backhaul interface to the next generation core network (NG-CN) 204 may terminate at the ANC. The backhaul interface to neighboring next generation access nodes (NG-ANs) may terminate at the ANC. The ANC may include one or more TRPs 208 (which may also be referred to as BSs, NR BSs, Node Bs, 5G NBs, APs, or some other term). As described above, a TRP may be used interchangeably with "cell."

The TRPs 208 may be a DU. The TRPs may be connected to one ANC (ANC 202) or more than one ANC (not illustrated). For example, for RAN sharing, radio as a service (RaaS), and service specific AND deployments, the TRP may be connected to more than one ANC. A TRP may include one or more antenna ports. The TRPs may be configured to individually (e.g., dynamic selection) or jointly (e.g., joint transmission) serve traffic to a UE.

The logical architecture 200 may be used to illustrate fronthaul definition. The logical architecture 200 may support fronthauling solutions across different deployment types. For example, the logical architecture 200 may be based on transmit network capabilities (e.g., bandwidth, latency, and/or jitter).

The logical architecture 200 may share features and/or components with LTE. The next generation AN (NG-AN) 210 may support dual connectivity with NR. The NG-AN 210 may share a common fronthaul for LTE and NR.

The logical architecture 200 may enable cooperation between and among TRPs 208. For example, cooperation may be preset within a TRP and/or across TRPs via the ANC 202. There may be no inter-TRP interface.

Logical architecture 200 may have a dynamic configuration of split logical functions. As will be described in more detail with reference to FIG. 5, the Radio Resource Control (RRC) layer, Packet Data Convergence Protocol (PDCP) layer, Radio Link Control (RLC) layer, Medium Access Control (MAC) layer, and a Physical (PHY) layers may be adaptably placed at the DU or CU (e.g., TRP or ANC, respectively).

Figure 3:
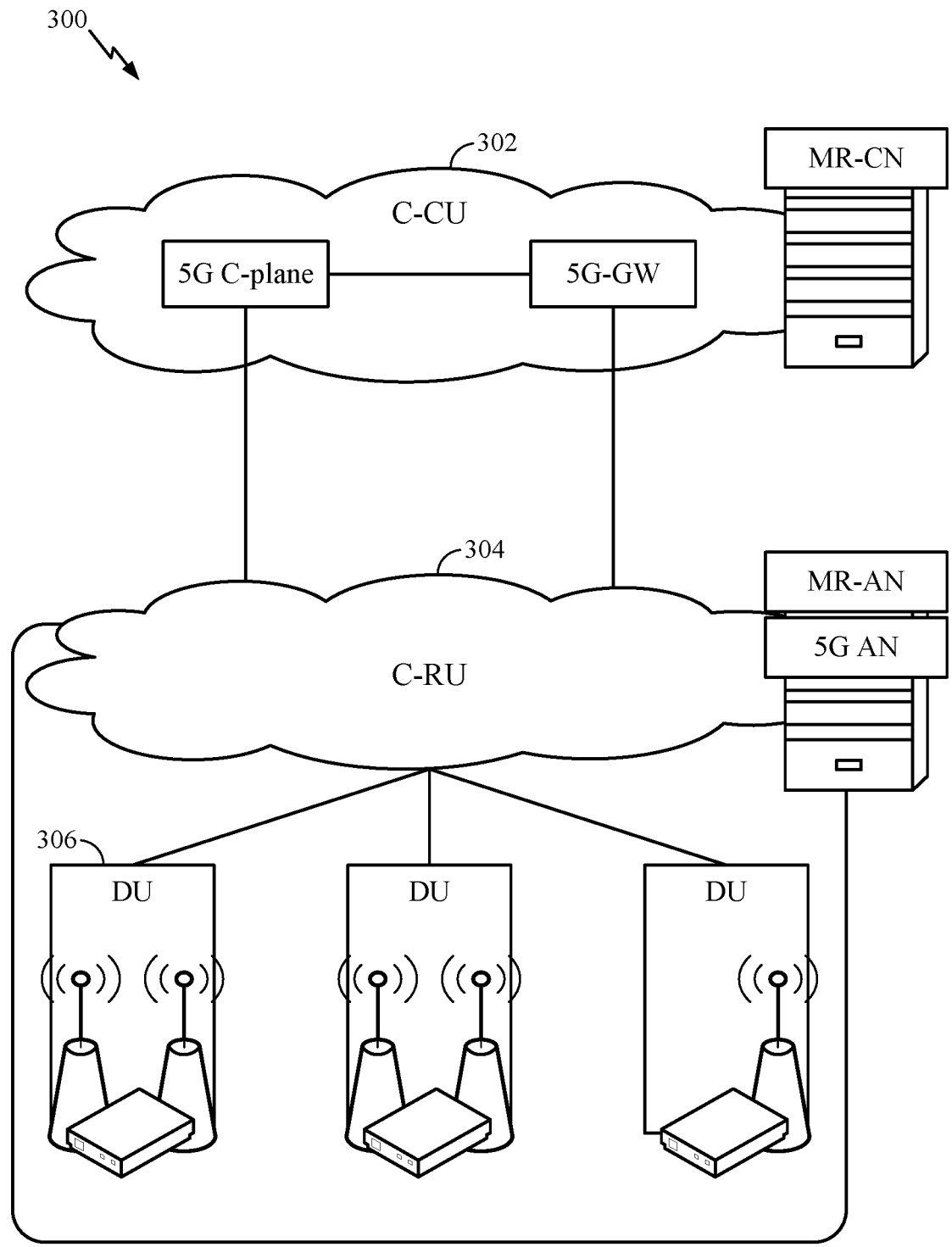
FIG. 3 is a diagram illustrating an example physical architecture of a distributed RAN, in accordance with certain aspects of the present disclosure.

FIG. 3 illustrates an example physical architecture 300 of a distributed RAN, according to aspects of the present disclosure. A centralized core network unit (C-CU) 302 may host core network functions. The C-CU 302 may be centrally deployed. C-CU functionality may be offloaded (e.g., to advanced wireless services (AWS)), in an effort to handle peak capacity.

A centralized RAN unit (C-RU) 304 may host one or more ANC functions. Optionally, the C-RU 304 may host core network functions locally. The C-RU 304 may have distributed deployment. The C-RU 304 may be close to the network edge.

A DU 306 may host one or more TRPs (edge node (EN), an edge unit (EU), a radio head (RH), a smart radio head (SRH), or the like). The DU may be located at edges of the network with radio frequency (RF) functionality.

Figure 4:
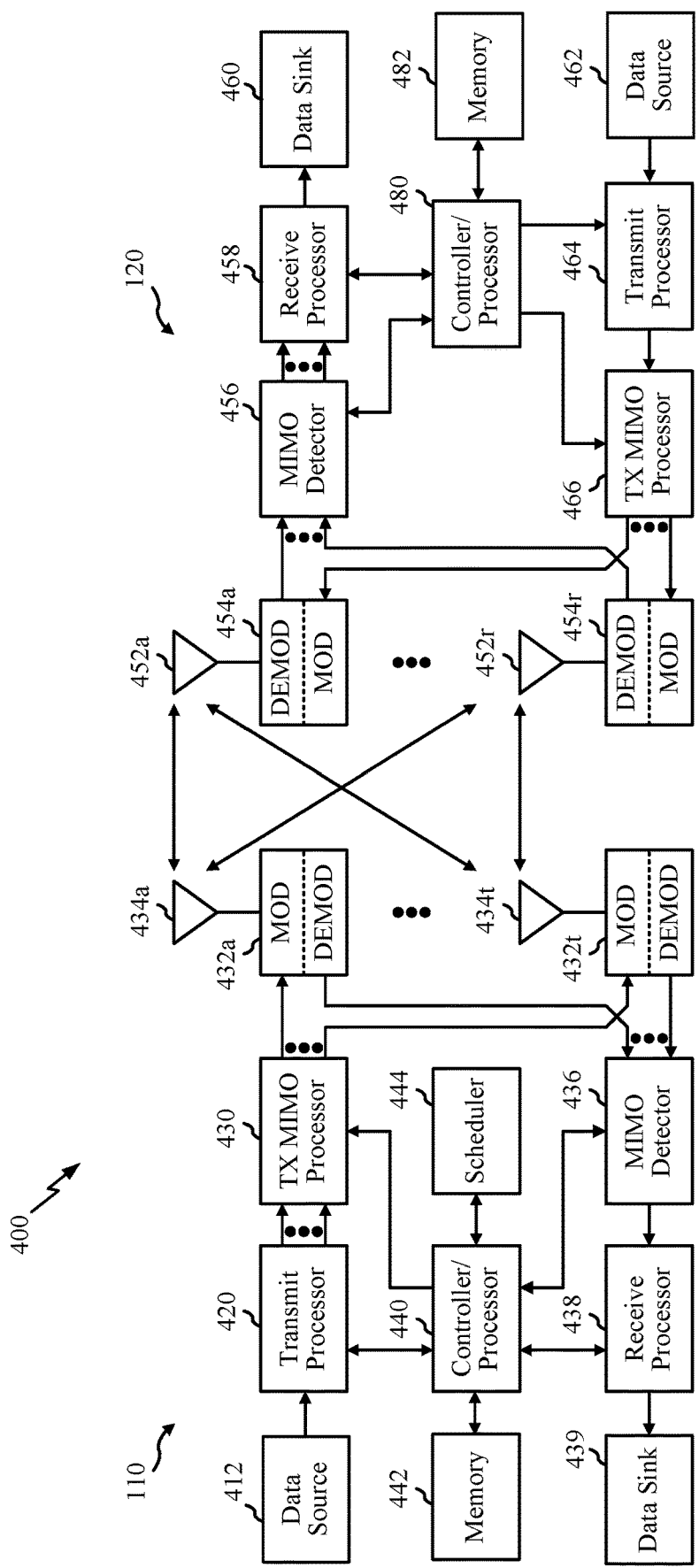
FIG. 4 is a block diagram conceptually illustrating a design of an example BS and user equipment (UE), in accordance with certain aspects of the present disclosure.

FIG. 4 illustrates example components of the BS 110 and UE 120 illustrated in FIG. 1, which may be used to implement aspects of the present disclosure. The BS may include a TRP and may be referred to as a Master eNB (MeNB) (e.g., Master BS, primary BS). Master BS and the Secondary BS may be geographically co-located.

One or more components of the UE 120 may be used to practice aspects of the present disclosure. For example, antennas 452, Tx/Rx 454, processors 466, 458, 464, and/or controller/processor 480 of the UE 120 may be used to perform operations described herein and complementary operations.

FIG. 4 shows a block diagram of a design of a BS 110 and a UE 120, which may be one of the BSs and one of the UEs in FIG. 1. For a restricted association scenario, the BS 110 may be the macro BS 110c in FIG. 1, and the UE 120 may be the UE 120y. The BS 110 may also be a BS of some other type. The BS 110 may be equipped with antennas 434a through 434t, and the UE 120 may be equipped with antennas 452a through 452r. As may be appreciated, in certain example implementations, BS 110 and/or UE 120 may comprise a receiving device configured to process a set of messages, at least in part, in accordance with certain aspects of the present description.

At the BS 110, a transmit processor 420 may receive data from a data source 412 and control information from a controller/processor 440. The control information may be for the Physical Broadcast Channel (PBCH), Physical Control Format Indicator Channel (PCFICH), Physical Hybrid ARQ Indicator Channel (PHICH), Physical Downlink Control Channel (PDCCH), etc. The data may be for the Physical Downlink Shared Channel (PDSCH), etc. The processor 420 may process (e.g., encode and symbol map) the data and control information to obtain data symbols and control symbols, respectively. The processor 420 may also generate reference symbols, e.g., for the PSS, SSS, and cell-specific reference signal (CRS). A transmit (TX) multiple-input multiple-output (MIMO) processor 430 may perform spatial processing (e.g., precoding) on the data symbols, the control symbols, and/or the reference symbols, if applicable, and may provide output symbol streams to the modulators (MODs) 432a through 432t. Each modulator 432 may process a respective output symbol stream (e.g., for OFDM, etc.) to obtain an output sample stream. Each modulator 432 may further process (e.g., convert to analog, amplify, filter, and upconvert) the output sample stream to obtain a downlink signal. Downlink signals from modulators 432a through 432t may be transmitted via the antennas 434a through 434t, respectively.

At the UE 120, the antennas 452a through 452r may receive the downlink signals from the base station 110 and may provide received signals to the demodulators (DE-MODs) 454a through 454r, respectively. Each demodulator 454 may condition (e.g., filter, amplify, downconvert, and digitize) a respective received signal to obtain input samples. Each demodulator 454 may further process the input samples (e.g., for OFDM, etc.) to obtain received symbols. A MIMO detector 456 may obtain received symbols from all the demodulators 454a through 454r, perform MIMO detection on the received symbols if applicable, and provide detected symbols. A receive processor 458 may process (e.g., demodulate, deinterleave, and decode) the detected symbols, provide decoded data for the UE 120 to a data sink 460, and provide decoded control information to a controller/processor 480. In certain implementations, receive processor 438 and/or receive processor 458 may be configured to implement at least a portion of at least one iterative process with regard to a set of received messages, in accordance with aspects of the present description. It should be recognized, however that claimed subject matter is not necessarily intended to be so limited.

On the uplink, at the UE 120, a transmit processor 464 may receive and process data (e.g., for the Physical Uplink Shared Channel (PUSCH)) from a data source 462 and control information (e.g., for the Physical Uplink Control Channel (PUCCH) from the controller/processor 480. The transmit processor 464 may also generate reference symbols for a reference signal. The symbols from the transmit processor 464 may be precoded by a TX MIMO processor 466 if applicable, further processed by the demodulators 454a through 454r (e.g., for SC-FDM, etc.), and transmitted to the base station 110. At the BS 110, the uplink signals from the UE 120 may be received by the antennas 434, processed by the modulators 432, detected by a MIMO detector 436 if applicable, and further processed by a receive processor 438 to obtain decoded data and control information sent by the UE 120. The receive processor 438 may provide the decoded data to a data sink 439 and the decoded control information to the controller/processor 440.

The controllers/processors 440 and 480 may direct the operation at the base station 110 and the UE 120, respectively. The processor 480 and/or other processors and modules at the UE 120 may perform or direct, the execution of processes and/or other complementary processes for the techniques described herein. The memories 442 and 482 may store data and program codes for the BS 110 and the UE 120, respectively. A scheduler 444 may schedule UEs for data transmission on the downlink and/or uplink.

Figure 5:
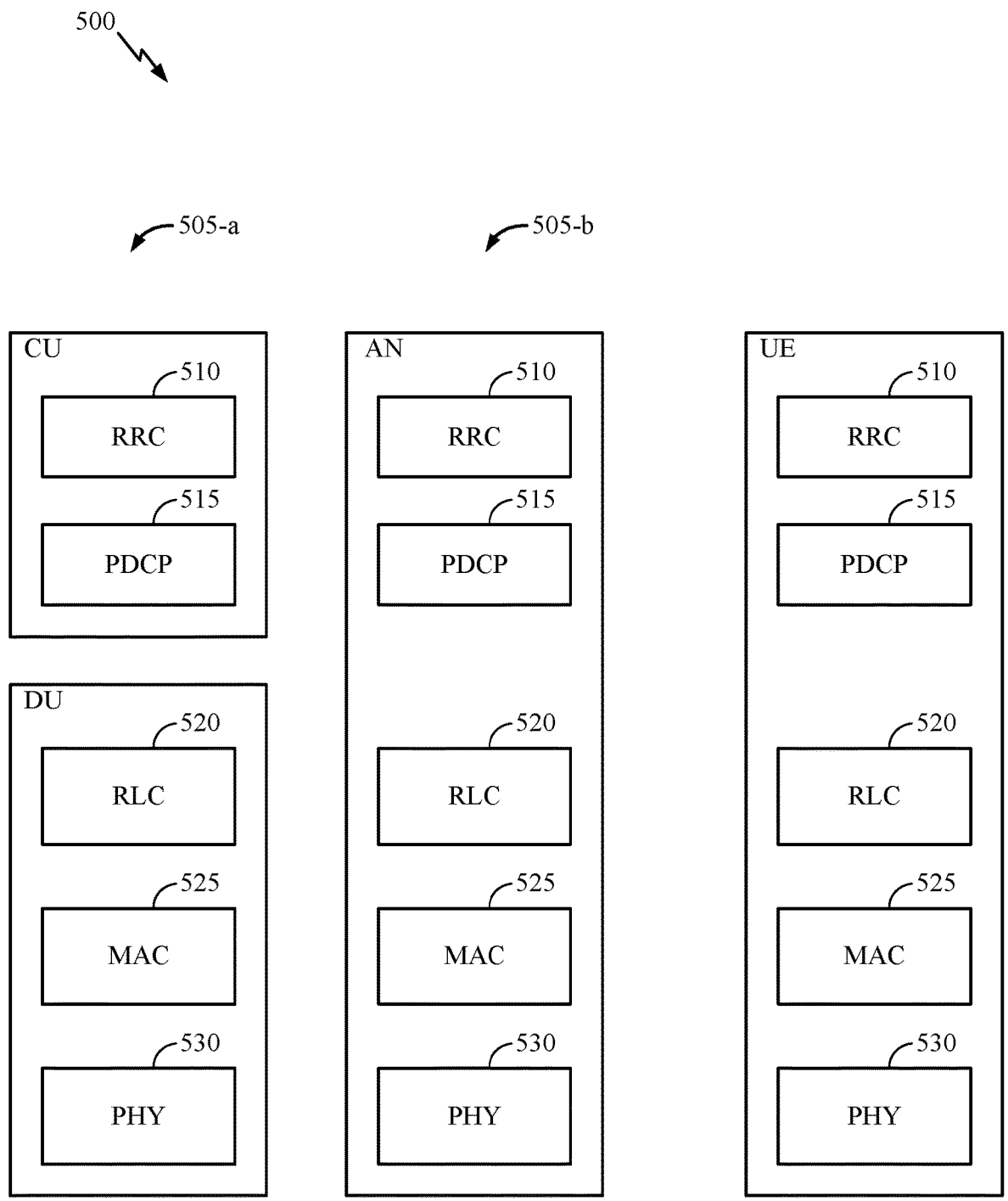
FIG. 5 is a diagram showing examples for implementing a communication protocol stack, in accordance with certain aspects of the present disclosure.

FIG. 5 illustrates a diagram 500 showing examples for implementing a communications protocol stack, according to aspects of the present disclosure. The illustrated communications protocol stacks may be implemented by devices operating in a in a 5G system. Diagram 500 illustrates a communications protocol stack including a Radio Resource Control (RRC) layer 510, a Packet Data Convergence Protocol (PDCP) layer 515, a Radio Link Control (RLC) layer 520, a Medium Access Control (MAC) layer 525, and a Physical (PHY) layer 530. In various examples the layers of a protocol stack may be implemented as separate modules of software, portions of a processor or ASIC, portions of non-collocated devices connected by a communications link, or various combinations thereof. Collocated and non-collocated implementations may be used, for example, in a protocol stack for a network access device (e.g., ANs, CUs, and/or DUs) or a UE.

A first option 505-a shows a split implementation of a protocol stack, in which implementation of the protocol stack is split between a centralized network access device (e.g., an ANC 202 in FIG. 2) and distributed network access device (e.g., DU 208 in FIG. 2). In the first option 505-a, an RRC layer 510 and a PDCP layer 515 may be implemented by the central unit, and an RLC layer 520, a MAC layer 525, and a PHY layer 530 may be implemented by the DU. In various examples the CU and the DU may be collocated or non-collocated. The first option 505-a may be useful in a macro cell, micro cell, or pico cell deployment.

A second option 505-b shows a unified implementation of a protocol stack, in which the protocol stack is implemented in a single network access device (e.g., access node (AN), new radio base station (NR BS), a new radio Node-B (NR NB), a network node (NN), or the like). In the second option, the RRC layer 510, the PDCP layer 515, the RLC layer 520, the MAC layer 525, and the PHY layer 530 may each be implemented by the AN. The second option 505-b may be useful in a femto cell deployment.

Regardless of whether a network access device implements part or all of a protocol stack, a UE may implement an entire protocol stack (e.g., the RRC layer 510, the PDCP layer 515, the RLC layer 520, the MAC layer 525, and the PHY layer 530).

In some circumstances, two or more subordinate entities (e.g., UEs) may communicate with each other using sidelink signals. Real-world applications of such sidelink communications may include public safety, proximity services, UE-to-network relaying, vehicle-to-vehicle (V2V) communications, Internet of Everything (IoE) communications, IoT communications, mission-critical mesh, and/or various other suitable applications. Generally, a sidelink signal may refer to a signal communicated from one subordinate entity (e.g., UE1) to another subordinate entity (e.g., UE2) without relaying that communication through the scheduling entity (e.g., UE or BS), even though the scheduling entity may be utilized for scheduling and/or control purposes. In some examples, the sidelink signals may be communicated using a licensed spectrum (unlike wireless local area networks, which typically use an unlicensed spectrum).

A UE may operate in various radio resource configurations, including a configuration associated with transmitting pilots using a dedicated set of resources (e.g., a radio resource control (RRC) dedicated state, etc.) or a configuration associated with transmitting pilots using a common set of resources (e.g., an RRC common state, etc.). When operating in the RRC dedicated state, the UE may select a dedicated set of resources for transmitting a pilot signal to a network. When operating in the RRC common state, the UE may select a common set of resources for transmitting a pilot signal to the network. In either case, a pilot signal transmitted by the UE may be received by one or more network access devices, such as an AN, or a DU, or portions thereof. Each receiving network access device may be configured to receive and measure pilot signals transmitted on the common set of resources, and also receive and measure pilot signals transmitted on dedicated sets of resources allocated to the UEs for which the network access device is a member of a monitoring set of network access devices for the UE. One or more of the receiving network access devices, or a CU to which receiving network access device(s) transmit the measurements of the pilot signals, may use the measurements to identify serving cells for the UEs, or to initiate a change of serving cell for one or more of the UEs.

Some receiving devices, such as, a UE, may use sidelink signals (e.g., V2V communications) for communicating certain messages that may be time-critical. For example, a safety message or the like from one vehicle to another travel nearby may convey information that is time critical. Though certain aspects are described with respect to V2V communications for ease of explanation and reference to a specific useful implementation, such aspects should not be limited to V2V communications and may be used for other types of communication.

Example Iterative Processing of Received Messages

Figure 6:
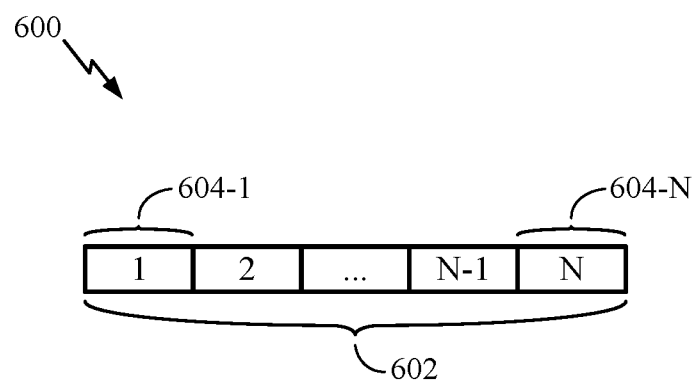
FIG. 6 graphically illustrates an example set of messages having a relative order, in accordance with certain aspects of the present disclosure.

FIG. 6 graphically illustrates an example set of messages 600 having a relative order 602, in accordance with certain aspects of the present disclosure. Set of messages 600 is illustrated in this simple example as comprising a plurality of messages 604-1 through 604-N. In certain instances, one or more of messages 604-1 through 604-N may have received by the receiving device from one or more other devices. In certain instances, two or more of messages 604-1 through 604-N may comprise the same or similar types of messages. In certain other instances, each of the messages 604-1 through 604-N may be of a different type. Regardless as the source and/or type of messages 604-1 through 604-N, in certain example implementations, a receiving device may be configured to perform at least one iterative process in an attempt to decode each of the messages in the set of messages 600. Hence, it may be that a receiving device is configured, e.g., using techniques presented herein, to limit a number of iterations that may be performed as part of an iterative process, e.g., in an attempt to decode a given message, e.g., message 604-1. As described in greater detail herein, example techniques are presented that may be used to dynamically determine an iterative threshold value for each message in the set of messages 600. Such an iterative threshold value may, for example, limit a number of time that an iterative process may be performed in attempting to decode or otherwise process a received message.

The relative order 602 as illustrated in this example represents received messages 604-1 through 604-N being arranged in some manner. Here, for the ease of example, regardless of the manner of arrangement there is shown a numerical sequence 1, 2, . . . , N–1, and N corresponding to an ascending order. Thus, in this example, a "next" message may be number-based, such that an initial next message may be message "1" (e.g., 604-1), followed by a next message "2", and continuing through to next message "N–1", and the final next message in set of messages 600 being message "N" (e.g., 604-N). Of course, it should be understood that other techniques may be used to indicate an order for use in process the set of messages 600. Various schemes may be used to determine a particular order for two or messages in set of messages 600, and thus claimed subject matter in also no necessarily intended to be limited by the examples presented herein. With this in mind, in certain example instances, an order may relate in some manner to times of receipt for the messages, or times of transmission for the messages, or one or more other prioritization aspects. For example, in some instances a set of messages 600 may be ordered based, at least in part, on message types, transmitting devices, communication channel(s), etc. In certain example implementations, one or more of the messages in set of messages 600 may comprise a safety message or the like (e.g., a basic safety message (BSM)), corresponding to a V2V or other like configuration.

Figure 7:
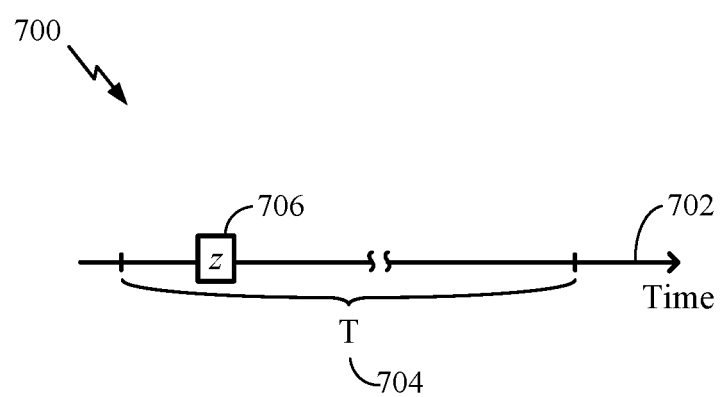
FIG. 7 graphically illustrates an example of a time-line showing a processing time budget and a processing time per iteration, in accordance with certain aspects of the present disclosure.

Attention is drawn next to FIG. 7, which graphically illustrates an example of a time-line 700 showing a time line 702, with a processing time budget 704 ("T") along with an example processing time per iteration 706 ("z"), in accordance with certain aspects of the present disclosure. Here, as shown, processing time budget 704 is much greater in length (time) than processing time per iteration 706. Accordingly, processing time budget 704 may span a plurality of processing time per iteration(s) 706.

In accordance with certain aspects of the present description, techniques are provided that may be implemented in a receiving device to try to process a set of messages 600 (FIG. 6) via at least one iterative process during at least a portion of processing time budget 704. Here, for example, the iterative process may correspond to the processing time per iteration 706. In certain instances, an iterative threshold value determined for a ("next") message may limit a number of iterations that may be performed in attempting to process that message. In certain example implementations, an iterative threshold value for a message may be determined based, at least in part, on a remaining portion of processing time budget 704, a processing time per iteration 706, a relative position of the message with regard to order 602 of the set of messages 600, and/or the like, or some combination thereof.

Figure 8:
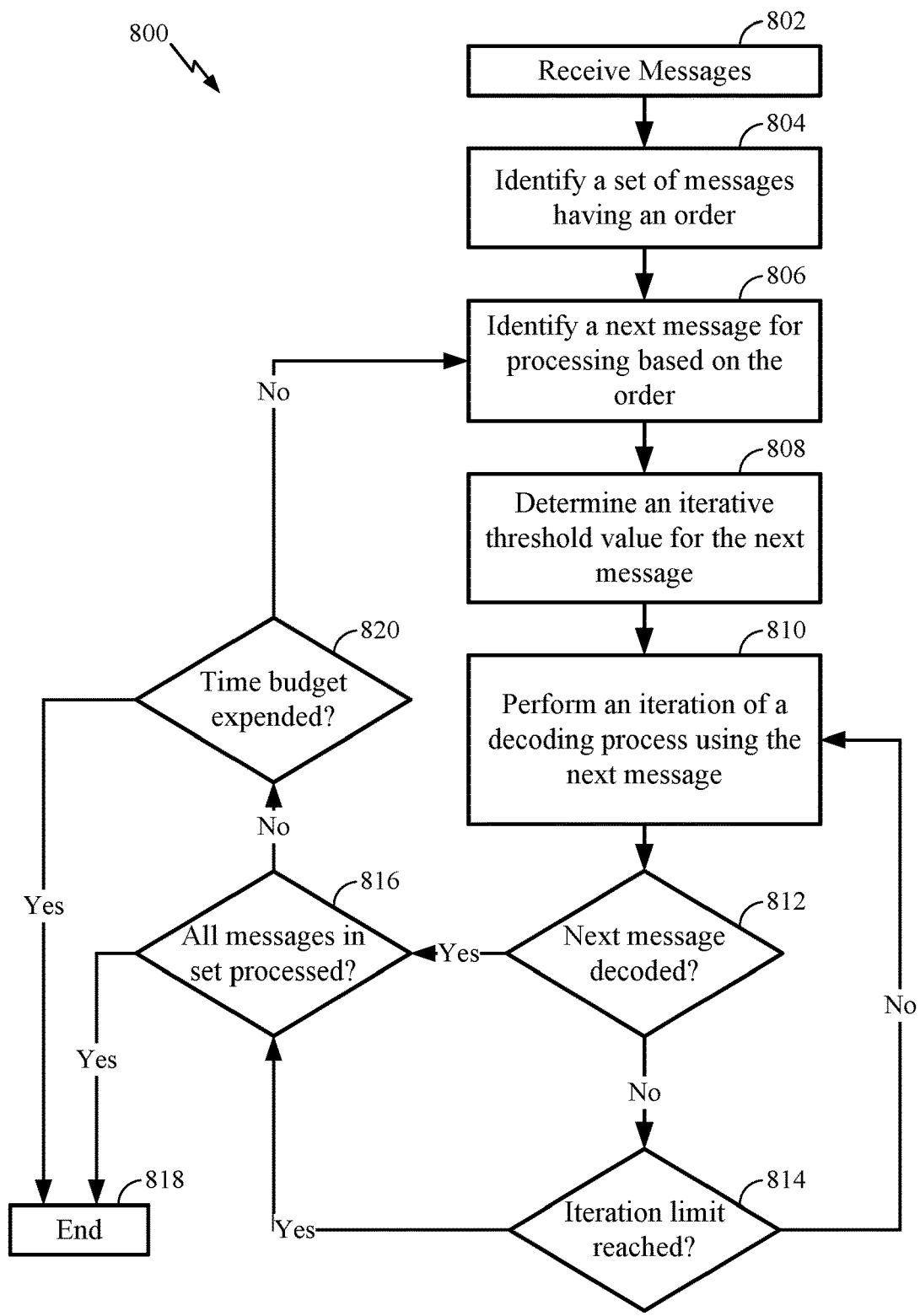
FIG. 8 is a flow-chart diagram conceptually illustrating an example method for use in iteratively processing messages at a receiving device, in accordance with certain aspects of the present disclosure.

Attention is drawn next to FIG. 8, which is a flow-chart diagram conceptually illustrating an example method 800 for use in iteratively processing messages at a receiving device, in accordance with certain aspects of the present disclosure.

At example block 802, a plurality of messages may be received or otherwise provided to a receiving device. As mentioned, two or more of these messages may be of the same or different types, may have been transmitted by the same or different transmitting devices, may have been received at different times, etc.

At example block 804, the receiving device may identify a set of messages having an order and comprising at least two of the messages received at block 802. In certain instances, a receiving device may determine or otherwise infer an order corresponding to the set of messages. As mentioned, various schemes may be employed to determine or otherwise infer an order. Regardless as to how an order is created, the order indicates an initial "next" message for processing, followed by a relative "next" message, and so on, for the set of messages. Hence, at example block 806, the receiving device may identify a next message for processing based, at least in part, on the order per block 804.

At example block 808, the receiving device may determine an iterative threshold value or the like for the next message. By way of an example, an iterative threshold value may indicate a maximum number of times that an iterative process may be performed in attempting to decode or otherwise process such a next message. Here, for example, an iterative threshold value may be based, at least in part, on a remaining portion of a processing time budget associated with the set of messages. In certain instances, for example, an iterative threshold value may be based, at least in part, on a relative position of such next message within the order identified at block 804. In certain instances, an iterative threshold value may be based, at least in part, on a processing time per iteration associated with the iterative process. In certain instances, an iterative threshold value may be based, at least in part, on at least one characteristic of a communication channel over which such next message was received by the receiving device.

At example block 810, the receiving device may perform an iteration of a decoding process or the like using such next message. Here, for example, such an iteration may consume all or part of a processing time per iteration.

At example block 812, a decision may be made as to whether such next message may or may not have been decoded or otherwise processed as may be desired via block 808. Thus, for example, it may be desired to attempt to completely decode such next message via one or more iterations performed at block 810, as limited by the iterative threshold value or the like as determined at block 808. However, in some other examples, a successful determination at block 812 may correspond to a desire to attempt to decode or otherwise process at least some minimum part or sections of such a next message at block 810, or possibly to achieve some measure of success regarding the processing of such next message.

As shown by the line labeled "No", a negative decision at block 812 may lead to another decision at example block 814, wherein a determination is made as to whether or not an iteration limit has been reached. For example, an iteration process corresponding to block 810 may have an iteration limit imposed using the iterative threshold value or the like per block 808. As shown by the line labeled "Yes", a negative decision at block 812 may lead to another decision at example block 816.

A negative decision ("No") at block 814, may lead process 800 to return to block 810 wherein another iteration may be performed. Hence, a loop may be formed of blocks 810, 812 and 814 that may permit several attempts to decode such next message via the iterative process of block 810. For such next message, this loop may end with a positive decoding decision at block 812 or reaching a positive iteration limit per decision 814. Accordingly, as shown by the line labeled "Yes", a positive decision at either of blocks 812 or 814, may lead to another decision at example block 816, wherein a determination is made as to whether or not all of the messages in the set of messages per block 804 have been processed. In response to a positive determination ("Yes") at block 816, process 800 may end. In response to a negative determination ("No") at block 816, process 800 may instead proceed to yet another decision block 820, wherein it is determined whether or not a processing time budget associated with the set of messages per block 804 has been expended.

At block 820, in response to a positive determination ("Yes"), namely that the processing time budget has expired, process 800 may end per block 818 as shown. In another example, although not shown, block 818 may lead back to block 802 or block 804, e.g., to begin like processing of another set of messages. At block 820 in response to a negative determination ("No"), namely that the processing time budget has not expired, process 800 may return to block 806, e.g., to initiate processing of a "next" message in the order corresponding to the set of messages.

Figure 9:
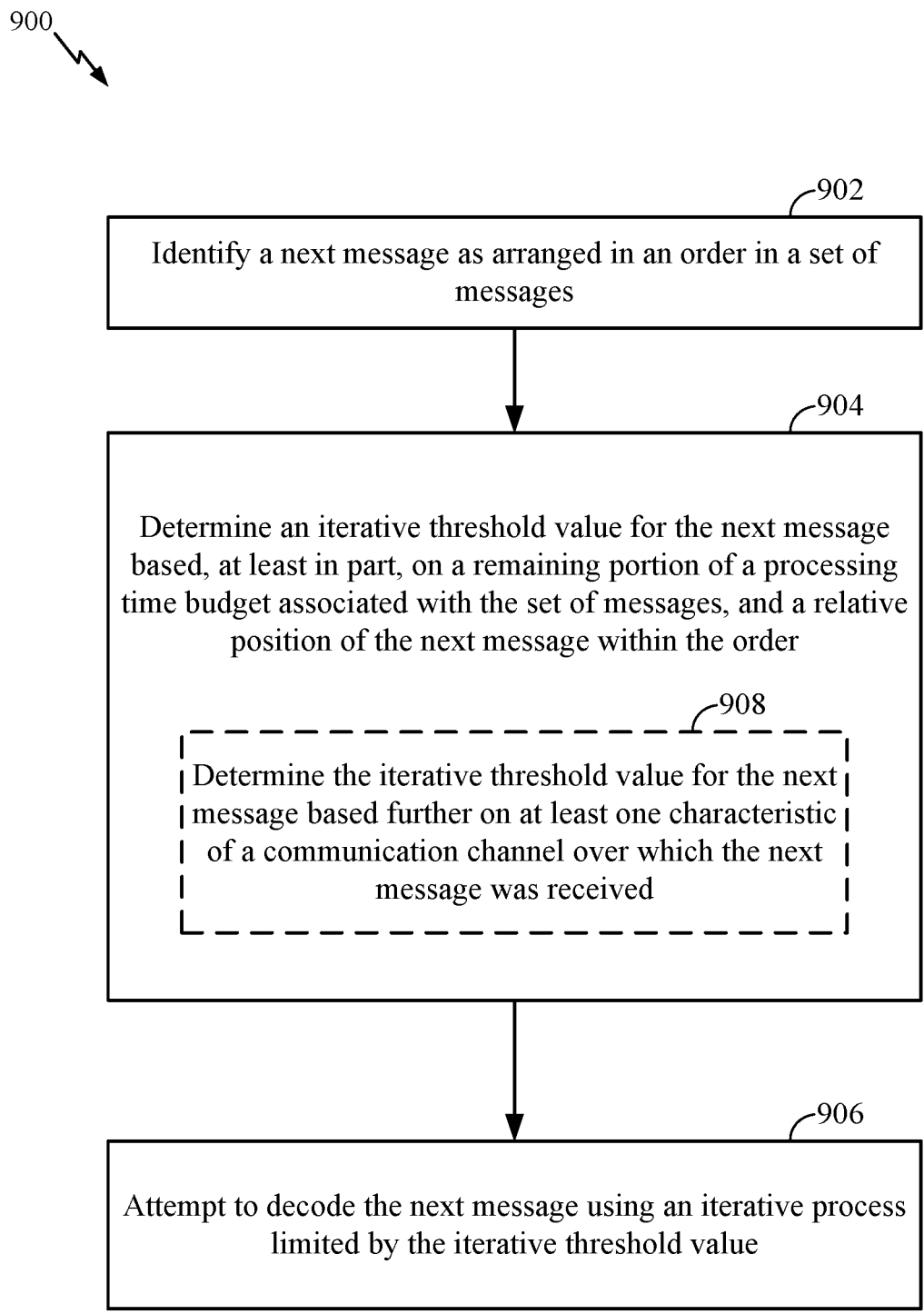
FIG. 9 is a diagram illustrating some example actions that may be performed in a receiving device in iteratively processing messages, in accordance with aspects of the present disclosure.

Attention is drawn next to FIG. 9, which is a diagram illustrating a method 900 showing some example actions that may be performed in a receiving device in iteratively processing messages, in accordance with aspects of the present disclosure.

At example block 902, a next message may be identified as arranged in a relative position of an order of messages of a set of messages. The order may correspond to all or part of an actual order in receipt or transmit time, or as stored in memory, or as indicated in some logical manner, etc.

At example block 904, an iterative threshold value for such a next message may be determined based, at least in part, on a remaining portion of a processing time budget and a relative position of such next message within the order of messages. By way of a non-limiting example, in certain instances a relative position may correspond to a numerical order, an alphabetical order, a memory address or other like order, etc.

In certain instances, as shown by optional (dashed line) block 908, an iterative threshold value may be determined, at least in part, based also on at least one characteristic of a communication channel over which such next message was received. By way of some examples, in certain implementations, a characteristic of a communication channel may comprise or otherwise correspond in some manner to a Doppler characteristic, or a delay spread characteristic, or a signal to interference ratio characteristic, or a signal to noise ratio characteristic, or some combination thereof, just to name a few examples. In certain instances, a characteristic of the communication channel may be based, at least in part, on a reference signal portion of data received via the communication channel conveying such next message.

At example block 906, an attempt may be made to decode such next message using an iterative process that may be limited by the iterative threshold value. Hence, for example, an attempt at block 906 may end prior to reaching a limit per the iterative threshold value if the desired level of decoding is achieved. Conversely, if in an attempt to achieve a desired level of decoding at block 906, the limit set by the iterative threshold value is reached, then the attempt at block 906 may end. Blocks 902, 904 and 906 may be repeated/applied for each "next" message within the set of messages based in the order.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

Figure 10:
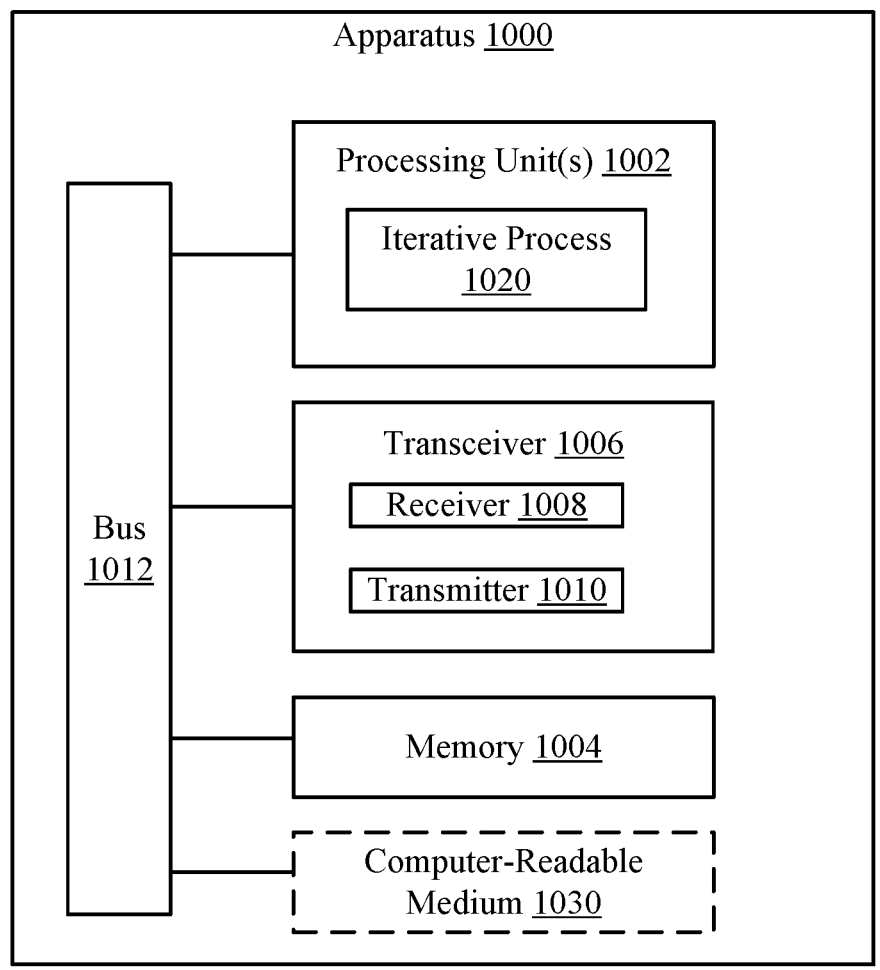
FIG. 10 is a block diagram illustrating certain components of an example apparatus 1000 that may be provided for use in a receiving device, in accordance with certain aspects of present disclosure.

FIG. 10 illustrates certain components of an example apparatus 1000 that may be provided in a receiving device, in accordance with certain aspects of present description. Apparatus 1000 may, for example, be part of a UE, or other device capable of processing messages using all of part of the techniques presented herein. In this example, apparatus 1000 comprises one or more processing units 1002, a memory 1004, and a transceiver 1006 that may be operatively coupled together, e.g., via one or more connections, circuits, etc., represented by bus 1012. In this example, transceiver 1006 is illustrated as possibly including a receiver 1008 and a transmitter 1010. Additionally, as illustrated, apparatus 100 may be configured to access a computer-readable medium 1030, shown here as optional in dashed line format.

As further illustrated, processing unit(s) 1002 may comprise an iterative process 1020 that may implement all or part of one or more of the techniques presented herein. Although iterative process 1020 is shown in this example within processing unit(s) 1002, it should be understood that the techniques presented herein may reside, at least in part, in transceiver 1006, memory 1004, computer-readable medium 1030, or some combination thereof, possibly including representative bus 1012. In certain implementations, all or part of apparatus 1000 may be provided as part of a modem, a SoC, a UE, a base station, a vehicle, a machine, a drone, a robot, etc.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein but is to be accorded the full scope consistent with the language of the claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for."

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The various illustrative logical blocks, modules and circuits described in connection with the present disclosure may be implemented or performed with a general-purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user terminal 120 (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein. For example, instructions for perform the operations described herein.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above.

Various modifications, changes and variations may be made in the arrangement, operation and details of the methods and apparatus described above without departing from the scope of the claims.

What is claimed is:

1. A method for use at a receiving device, the method comprising:
   receiving, via a sidelink communication, a set of messages comprising at least a first message received from a first source device and at least a second message from a second source device;
   identifying an order for decoding each message in the set of messages based, at least in part, on a type of at least one message in the set of messages, a priority associated with at least one message in the set of messages, a source device associated with at least one message in the set of messages, or some combination thereof; and
   attempting to decode the set of messages by:
      identifying, based on the order, a next message of the set of messages for decoding;
      determining an iterative threshold value for the next message based, at least in part, on a remaining portion of a processing time budget allotted for decoding all of the messages in the set of messages, and a relative position of the next message within the order; and
      attempting to decode the next message, at least in part, using an iterative process that is limited by the iterative threshold value.

2. The method as recited in claim 1, and further comprising:
   determining the iterative threshold value for the next message based further on at least one characteristic of a communication channel over which the next message was received by the receiving device.

3. The method as recited in claim 2, wherein the at least one characteristic of the communication channel corresponds to a Doppler characteristic, or a delay spread characteristic, or a signal to interference ratio characteristic, or a signal to noise ratio characteristic, or some combination thereof.

4. The method as recited in claim 3, wherein the at least one characteristic of the communication channel is based, at least in part, on a reference signal portion of data received via the communication channel conveying the next message.

5. The method as recited in claim 2, wherein the at least one characteristic of the communication channel is based on a reference signal portion of data received via the communication channel.

6. The method as recited in claim 1, wherein:
   the first message comprises a vehicle to vehicle (V2V) safety message, or
   the receiving device comprises a user equipment (UE), or both.

7. The method as recited in claim 1, wherein the iterative threshold value for the next message is equal to $a*T/(N-k+1)/z$, wherein the sequential order is represented as messages numbered 1 through N with N being an integer greater than 1, k represents the next message as numbered by the sequential order with k being an integer, T represents the processing time budget, z represents a processing time per iteration of the iterative process, and a represents a weighting factor with a being a real number.

8. The method as recited in claim 7, wherein the weighting-factor, a, is based, at least in part, on at least one characteristic of a communication channel over which the message k was received by the receiving device, or a sequence number corresponding to the next message within the sequential order, or a both.

9. The method as recited in claim 8, wherein the weighting factor, a, for a message number 1 is greater than the weighting factor, a, for a message number N.

10. The method as recited in claim 8, wherein the weighting factor, a, for a message number N is greater than the weighting factor, a, for a message number 1.

11. A receiving device comprising:
    a receiver;
    memory; and
    a processing unit coupled to the receiver and the memory and configured to:
       receive, via the receiver through a sidelink communication, a set of messages comprising at least a first message received from a first source device and at least a second message from a second source device;
       identify an order for decoding each message in the set of messages based, at least in part, on a type of at least one message in the set of messages, a priority associated with at least one message in the set of messages, a source device associated with at least one message in the set of messages, or some combination thereof;
       identify, based on the order, a next message of the set of messages to decode;
       determine an iterative threshold value for the next message based, at least in part, on a remaining portion of a processing time budget allotted for decoding all of the messages in the set of messages, and a relative position of the next message within the order; and
       attempt to decode the next message, at least in part, using an iterative process that is limited by the iterative threshold value.

12. The receiving device as recited in claim 11, wherein the processing unit is further configured to determine the iterative threshold value for the next message based further on at least one characteristic of a communication channel over which the next message was received via the receiver.

13. The receiving device as recited in claim 12, wherein the at least one characteristic of the communication channel corresponds to a Doppler characteristic, or a delay spread characteristic, or a signal to interference ratio characteristic, or a signal to noise ratio characteristic, or some combination thereof.

14. The receiving device as recited in claim 13, wherein the at least one characteristic of the communication channel is based, at least in part, on a reference signal portion of data received via the communication channel conveying the next message.

15. The receiving device as recited in claim 12, wherein the at least one characteristic of the communication channel is based on a reference signal portion of data received via the communication channel.

16. The receiving device as recited in claim 11, wherein:
    the first message comprises a vehicle to vehicle (V2V) safety message, or
    the receiving device comprises a user equipment (UE), or both.

17. The receiving device as recited in claim 11, wherein the processing unit is further configured to determine that the iterative threshold value for next message is equal to $a*T/(N-k+1)/z$, wherein the sequential order is represented as messages numbered 1 through N with N being an integer greater than 1, k represents the next message as numbered by the sequential order with k being an integer, T represents the processing time budget, z represents a processing time per iteration of the iterative process, and a represents a weighting factor with a being a real number.

18. The receiving device as recited in claim 17, wherein the weighting factor, a, is based, at least in part, on at least one characteristic of a communication channel over which the message k was received via the receiver, or a sequence number corresponding to the next message within the sequential order, or a both.

19. The UE as recited in claim 18, wherein the weighting factor, a, for a message number 1 is greater than the weighting factor, a, for a message number N.

20. The UE as recited in claim 18, wherein the weighting factor, a, for a message number N is greater than the weighting factor, a, for a message number 1.

21. An apparatus for use by a receiving device, the apparatus comprising:
   means for receiving, via a sidelink communication, a set of messages comprising at least a first message received from a first source device and at least a second message from a second source device;
   means for identifying an order for decoding each message in the set of messages based, at least in part, on a type of at least one message in the set of messages, a priority associated with at least one message in the set of messages, a source device associated with at least one message in the set of messages, or some combination thereof; and
   means for decoding the set of messages by:
      identifying, based on the order, a next message of the set of messages for decoding;
      determining an iterative threshold value for the next message based, at least in part, on a remaining portion of a processing time budget allotted for decoding all of the messages in the set of messages, and a relative position of the next message within the order; and
      attempting to decode the next message, at least in part, using an iterative process that is limited by the iterative threshold value.

22. The apparatus as recited in claim 21, and further comprising:
   means for determining the iterative threshold value for the next message based further on at least one characteristic of a communication channel over which the next message was received by the receiving device.

23. The apparatus as recited in claim 22, wherein the at least one characteristic of the communication channel corresponds to a Doppler characteristic, or a delay spread characteristic, or a signal to interference ratio characteristic, or a signal to noise ratio characteristic, or some combination thereof.

24. The apparatus as recited in claim 23, wherein the at least one characteristic of the communication channel is based, at least in part, on a reference signal portion of data received via the communication channel conveying the next message.

25. The apparatus as recited in claim 22, wherein the at least one characteristic of the communication channel is based on a reference signal portion of data received via the communication channel.

26. The apparatus as recited in claim 21, wherein:
   the first message comprises a vehicle to vehicle (V2V) safety message, or
   the receiving device comprises a user equipment (UE), or both.

27. The apparatus as recited in claim 21, wherein the iterative threshold value for the next message is equal to a*T/(N−k+1)/z, wherein the sequential order is represented as messages numbered 1 through N with N being an integer greater than 1, k represents the next message as numbered by the sequential order with k being an integer, T represents the processing time budget, z represents a processing time per iteration of the iterative process, and a represents a weighting factor with a being a real number.

28. The apparatus as recited in claim 27, wherein the weighting factor, a, is based, at least in part, on at least one characteristic of a communication channel over which the message k was received by the receiving device, or a sequence number corresponding to the next message within the sequential order, or a both.

29. The apparatus as recited in claim 28, wherein the weighting factor, a, for a message number 1 is greater than the weighting factor, a, for a message number N.

30. The apparatus as recited in claim 28, wherein the weighting factor, a, for a message number N is greater than the weighting factor, a, for a message number 1.

31. An article of manufacture comprising:
   a non-transitory computer readable medium having stored therein computer implementable instructions executable by a processing unit of a receiving device to:
      receive a set of messages transmitted over a sidelink communication, comprising at least a first message received from a first source device and at least a second message from a second source device;
      identify an order for decoding each message in the set of messages based, at least in part, on a type of at least one message in the set of messages, a priority associated with at least one message in the set of messages, a source device associated with at least one message in the set of messages, or some combination thereof;
      identify, based on the order, a next message of the set of messages to decode;
      determine an iterative threshold value for the next message based, at least in part, on a remaining portion of a processing time budget allotted for decoding all of the messages in the set of messages, and a relative position of the next message within the order; and
      attempt to decode the next message, at least in part, using an iterative process that is limited by the iterative threshold value.

32. The article as recited in claim 31, and comprising further computer implementable instructions executable by the processing unit of the receiving device to determine the iterative threshold value for the next message based further on at least one characteristic of a communication channel over which the next message was received by the receiving device.

33. The article as recited in claim 32, wherein the at least one characteristic of the communication channel corresponds to a Doppler characteristic, or a delay spread characteristic, or a signal to interference ratio characteristic, or a signal to noise ratio characteristic, or some combination thereof.

34. The article as recited in claim 33, wherein the at least one characteristic of the communication channel is based, at least in part, on a reference signal portion of data received via the communication channel conveying the next message.

35. The article as recited in claim 32, wherein the at least one characteristic of the communication channel is based on a reference signal portion of data received via the communication channel.

36. The article as recited in claim 31, wherein:
the first message comprises a vehicle to vehicle (V2V) safety message, or
the receiving device comprises a user equipment (UE), or both.

37. The article as recited in claim 31, wherein the iterative threshold value is applied as a weighting factor in determining the iterative threshold value.

38. The article as recited in claim 31, and comprising further computer implementable instructions executable by the processing unit of the UE to determine that the iterative threshold value for next message is equal to $a*T/(N-k+1)/z$, wherein the sequential order is represented as messages numbered 1 through N with N being an integer greater than 1, k represents the next message as numbered by the sequential order with k being an integer, T represents the processing time budget, z represents a processing time per iteration of the iterative process, and a represents a weighting factor with a being a real number.

39. The article as recited in claim 38, wherein the weighting factor, a, is based, at least in part, on at least one characteristic of a communication channel over which the message k was received via the receiver, or a sequence number corresponding to the next message within the sequential order, or a both.

40. The article as recited in claim 39, wherein the weighting factor, a, for a message number 1 is greater than the weighting factor, a, for a message number N.

41. The article as recited in claim 39, wherein the weighting factor, a, for a message number N is greater than the weighting factor, a, for a message number 1.

\* \* \* \* \*